(12) United States Patent
Lu et al.

(10) Patent No.: US 11,305,277 B2
(45) Date of Patent: Apr. 19, 2022

(54) MICRO-STRUCTURED MOLD-CORE OF MICROFLUIDIC CHIP AND ITS MANUFACTURING METHOD

(71) Applicant: SHENZHEN UNIVERSITY, Shenzhen (CN)

(72) Inventors: Yanjun Lu, Shenzhen (CN); Fumin Chen, Shenzhen (CN); Xiaoyu Wu, Shenzhen (CN); Chaolan Zhou, Shenzhen (CN); Qiyang Peng, Shenzhen (CN); Jiatao Zhang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 16/634,100

(22) PCT Filed: Dec. 10, 2018

(86) PCT No.: PCT/CN2018/120074
§ 371 (c)(1),
(2) Date: Jan. 24, 2020

(87) PCT Pub. No.: WO2020/118487
PCT Pub. Date: Jun. 18, 2020

(65) Prior Publication Data
US 2021/0291170 A1    Sep. 23, 2021

(51) Int. Cl.
*B29C 45/26*  (2006.01)
*B01L 3/00*   (2006.01)
*B29C 33/38*  (2006.01)

(52) U.S. Cl.
CPC ... *B01L 3/502707* (2013.01); *B01L 3/502715* (2013.01); *B29C 33/3842* (2013.01);
(Continued)

(58) Field of Classification Search
CPC ......... B01L 3/502707; B01L 3/502715; B01L 2200/12; B01L 2300/0883; B29C 33/3842; B29C 45/26
See application file for complete search history.

(56) References Cited

U.S. PATENT DOCUMENTS

2015/0343442 A1    12/2015  Sameoto
2017/0225363 A1 *   8/2017  Konstantinou ....... B29C 39/003

FOREIGN PATENT DOCUMENTS

AU    7933991 A    10/1991
CN    1730142 A     2/2006
(Continued)

*Primary Examiner* — Brian J. Sines
(74) *Attorney, Agent, or Firm* — Robert L. Stearns; Dickinson Wright, PLLC (57) ABSTRACT

A micro-structured mold-core of a microfluidic chip and its manufacturing method, which includes the steps of: installing a mold-core on a worktable of a five-axis machining center, and installing a micro-milling cutter and a fine milling-grinding tool on a tool holder of the five-axis machining center; rough-milling a surface of the mold-core using the micro-milling cutter according to a preset first machining track, to form a micro-projection array structure with a specific shape; finishing a surface of the micro-projection array structure formed by rough-milling using the fine milling-grinding tool according to a preset second machining track, to form a desired micro-projection array structure; and installing the mold-core on an injection molding machine, and adding particle material of polymer for micro injection molding to form a microfluidic chip, or installing the mold-core on a hot-embossing machine, and adding block material of polymer for hot embossing to form a microfluidic chip.

18 Claims, 7 Drawing Sheets

(52) U.S. Cl.
CPC ........... *B29C 45/26* (2013.01); *B01L 2200/12* (2013.01); *B01L 2300/0883* (2013.01)

(56) References Cited

FOREIGN PATENT DOCUMENTS

| | | | |
|---|---|---|---|
| CN | 2830038 | Y | 10/2006 |
| CN | 101048143 | A | 10/2007 |
| CN | 101187717 | A | 5/2008 |
| CN | 101189271 | A | 5/2008 |
| CN | 101468506 | A | 7/2009 |
| CN | 102092669 | A | 6/2011 |
| CN | 102123838 | A | 7/2011 |
| CN | 103752356 | A | 4/2014 |
| CN | 103895143 | A | 7/2014 |
| CN | 104191548 | A | 12/2014 |
| CN | 206334685 | U | 7/2017 |
| CN | 207521025 | U | 6/2018 |
| EP | 0458405 | A2 | 11/1991 |

\* cited by examiner

MICRO-STRUCTURED MOLD-CORE OF MICROFLUIDIC CHIP AND ITS MANUFACTURING METHOD

CROSS REFERENCE TO RELATED APPLICATION

The present application is a 35 U.S.C. § 371 national stage application of PCT Application Ser. No. PCT/CN2018/120074 filed on Dec. 10, 2018, the entire content of which are incorporated herein by reference in their entirety.

TECHNICAL FIELD

The present application relates to the technical field of microfluidic chip, and more particularly to a micro-structured mold-core of a microfluidic chip and its manufacturing method.

BACKGROUND

At present, microfluidic chip technique is an important research area for the development of micro-analytical detection systems, in order to meet needs of miniaturization, integration and portability of analysis and detection equipment. Microfluidic chips have advantages of miniaturization, integration, low reagent consumption, good selectivity, fast analysis speed and low cost. Usually, microfluidic channels with corresponding requirement are arranged on the surface of the microfluidic chip, and corresponding reagent is added at a specified microfluidic port, through which the reagent enters and to a specified location for reacting. The traditional microfluidic chip has few channels, the commonly used microfluidic chip has a simple structure and the roughness inside the channel are large, which will affect the fluidity of reagents, and it is not suitable for more complicated reagent detection, such that the microfluidic chip cannot be better utilized.

To solve such problems, the machining process of the microfluidic chip in the market has been improved, so as to improve the surface quality of the microfluidic chip flow channel and increase the utilization rate of the microfluidic chip. Traditionally, micro-structured channels on the surface of microfluidic chips are usually manufactured by electrochemical etching processes such as laser beam processing, hot-embossing technique and so on. However, these machining processes cannot produce high shape accuracy and high surface quality of the micro-grooved array structure of the chip, such that the shape and size accuracy of the micro-structured of the chip and the utilization rate of the chip cannot be guaranteed.

Technical Problem

The objective of the present application is to provide a micro-structured mold-core of a microfluidic chip and its manufacturing method, that solve technical problems of low shape accuracy and low surface quality of the microfluidic chip existed in prior arts due to an application of processes such as laser processing and electrochemical etching, and a technical problem of low utilization rate of the microfluidic chip.

Technical Solution

To achieve the above objective, the present application provides a manufacturing method of a microfluidic chip, which includes the following steps:

installing a mold-core on a worktable of a five-axis machining center, and installing a micro-milling cutter and a fine milling-grinding tool on a tool holder of the five-axis machining center;

rough-milling a surface of the mold-core using the micro-milling cutter according to a preset first machining track, to form a micro-projection array structure with a specific shape;

finishing a surface of the micro-projection array structure formed by rough-milling using the fine milling-grinding tool according to a preset second machining track, to form a desired micro-projection array structure, where the size of the micro-protrusion array structure formed by rough-milling is larger than the size of which formed by finishing; and installing the mold-core on an injection molding machine, and adding particle material of polymer for micro injection molding to form a microfluidic chip, and a surface of the microfluidic chip has a micro-grooved array structure.

The present application also provides another manufacturing method of a microfluidic chip, which includes the following steps:

installing a mold-core on a worktable of a five-axis machining center, and installing a micro-milling cutter and a fine milling-grinding tool on a tool holder of the five-axis machining center;

rough-milling a surface of the mold-core using the micro-milling cutter according to a preset first machining track to form a micro-projection array structure with a specific shape;

finishing a surface of the micro-projection array structure formed by rough-milling using the fine milling-grinding tool according to a preset second machining track to form a desired micro-projection array structure, and the size of the micro-protrusion array structure formed by rough-milling is larger than the size of which formed by finishing; and installing the mold-core on a hot-embossing machine, and adding block material of polymer for hot embossing to form a microfluidic chip, and a surface of the microfluidic chip has a micro-grooved array structure.

Further, a spindle speed of the five-axis machining center is between 5000 to 20,000 rpm, a feed depth of the micro-milling cutter is between 0.1 to 50 micrometers, and a feed speed of the micro-milling cutter is between 10 to 1000 mm/min.

Further, the micro-grooved array structure includes a plurality of micro-channels connected in sequence, and a groove depth of each of the micro-channels is between 10 to 800 micrometers.

Further, each of the micro-channels includes a first channel, a second channel and a transition channel connected between the first channel and the second channel, and a trench interval between the first channel and the second channel is in a range from 10 to 500 microns.

Further, the material of the mold-core may be ceramic, diamond, mold steel or hard alloy.

Further, the material of the microfluidic chip includes one of polyamide, polyethylene terephthalate, polydimethylsiloxane, polymethyl methacrylate, polypropylene or polycarbonate, or a mixture of two or more.

Further, the first channel, the second channel and the transition channel each includes:

a first side surface;

a second side surface disposed opposite to the first side surface; and a bottom surface, both ends of which are respectively connected to the first side surface and the second side surface;

the first side surface, the bottom surface and the second side surface together form a V-shape, a U-shape or a rectangle.

The present application also provides a micro-structured mold-core of a microfluidic chip with a mold-core body, in which a surface of the mold-core body is provided with a micro-protrusion array structure, where a micro-projection array structure with a specific shape is formed by rough-milling the micro-protrusion array structure on the surface of the mold-core body using the micro-milling cutter, and finishing the surface of the rough-milled micro-projection array structure using a fine milling-grinding tool, where the micro-projection array structure includes a plurality of micro-projections connected in sequence, and each of the micro-projections includes a first connection section, a second connection section and a transition section connected between the first connection section and the second connection section.

Further, the first and second connection sections are a straight section, and the transition section is an arc-shaped or a straight section.

Further, the heights of the first connection section, the second connection section and the transition section are all between 10 to 800 micrometers, and the widths of the first connection section, the second connection section and the transition section are all between 10 to 500 microns, and an interval distance between the first connection section and the second connection section is in a range from 10 to 500 microns.

Further, the first connection section, the second connection section and the transition section each includes:

a third side surface, a fourth side surface opposite to the third side surface; and a top surface, bath ends of which are respectively connected to the third side surface and the fourth side surface;

the third side surface, the top surface and the fourth side surface together form a V shape, a U shaped or a rectangle.

Beneficial Effect

The micro-structured mold-core of the microfluidic chip and its manufacturing method provided by this disclosure at least have beneficial effects as follows: the manufacturing method of the microfluidic chip of the present application, compared with the prior art, rough-milling the surface of the mold-core using the micro-milling cutter to form the micro-projection array structure with a specific shape, then finishing the surface of the micro-protrusion array structure formed by rough-milling using the fine milling-grinding tool to form a high-precision micro-protrusion array structure, and finally installing the mold-core on the injection molding machine, and adding particle material of polymer for micro injection molding to efficiently form a microfluidic chip with a high-quality micro-grooved array structure, or installing the processed mold-core on the hot-embossing machine, and adding block material of polymer for hot embossing to form a high-quality micro-structured microfluidic chip, of which the shape is controllable, thus, it effectively improves the utilization rate of the surface of the microfluidic chip and solves the problem that the shape and size accuracy and the processing quality of micro-structure process cannot be guaranteed as in prior arts the micro-structures of microfluidic chips are produced by the electrochemical etching processes such as laser beam processing, such that the mass production and manufacture of microfluidic chips can be realized, thereby greatly reduces the manufacturing costs.

BRIEF DESCRIPTION OF THE DRAWINGS

In order to explain the technical solution of embodiments of the present application more clearly, the drawings used in the description of the embodiments will be briefly described hereinbelow. Obviously, the drawings in the following description are merely some embodiments of the present application, and for persons skilled in the art, other drawings may also be obtained on the basis of these drawings without any creative work.

Reference numerals in figures are listed as follows:

20—fine milling-grinding tool; 30—mold-core; 31—mold-core body; 32—micro-protrusion array structure; 33—micro-protrusion; 331—first connection section; 3311—third side surface; 3312—fourth side surface; 3313—top surface; 332—second connection section; 333—transition section; 40—microfluidic chip; 41—micro-grooved array structure; 42—micro-channel; 421—first channel; 4211—first side surface; 4212—second side surface; 4213—bottom surface; 422—second channel; 423—transition channel.

DETAILED DESCRIPTION OF THE EMBODIMENTS

In order to make the objectives, technical solutions and advantages of the disclosure more comprehensible, the disclosure is further described in detail hereinbelow with reference to the accompanying drawings and embodiments. It is understood that specific embodiments described herein are merely illustrative of the present application and are not intended to limit the present application.

It should be noted that when an element is referred to as "fixed to" or "disposed on" another element, it may be directly or indirectly on the other element. When an element is referred to as being connected to another element, it may be directly or indirectly connected to the other element.

It should be understood that orientations or positional relationships indicated by terms "length", "width", "upper", "lower", "front", "back", "left", "right", "vertical", "horizontal", "top", "bottom", "inner" and "outer" and the like are based on the orientations or positional relationships shown in the drawings, and are merely for conveniences of describing the embodiments and simplifying the description, and are not intended to indicate or imply that the device referred to or the element must have a specific orientation, constructed and operated in a specific orientation. These thus cannot be understood as limitations to the present application.

In addition, the terms "first" and "second" are used for description only and should not be understood as indicating or implying relative importance or implicitly indicating the number of technical features indicated. Therefore, features defined as "first" and "second" may explicitly or implicitly include one or more of this features. In the description of this disclosure, the meaning of "multiple" may be two or more, unless it is clearly and specifically defined otherwise.

Figure 1:
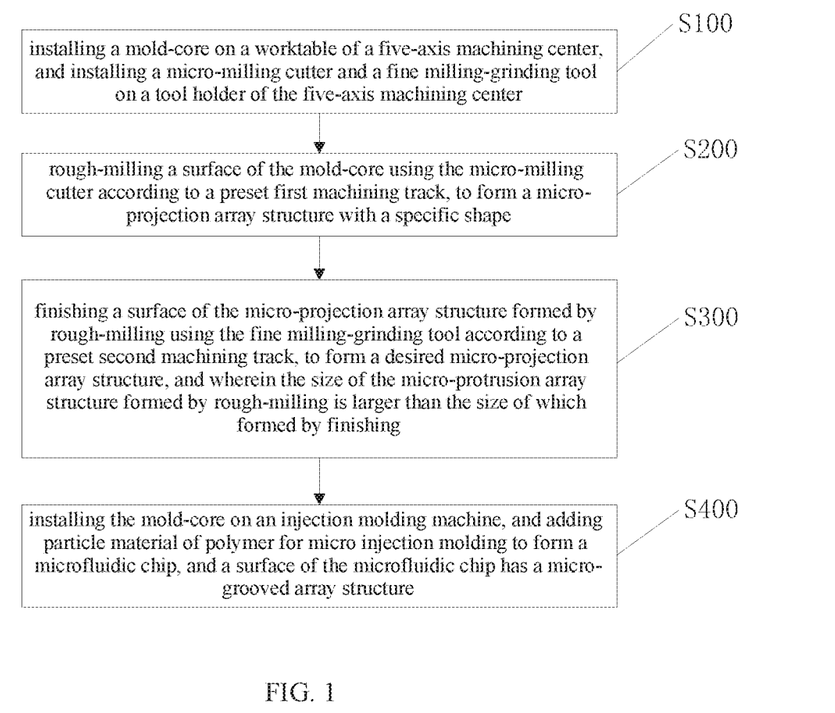
FIG. 1 is a flowchart of a manufacturing method of a microfluidic chip according to an embodiment of the present application.

Please refer to FIG. 1, a manufacturing method of a microfluidic chip provided by the disclosure is described hereby. The manufacturing method of the microfluidic chip includes steps S100, S200, S300 and S400:

S100, installing a mold-core on a worktable of a five-axis machining center, and installing a micro-milling cutter and a fine milling-grinding tool on a tool holder of the five-axis machining center.

S200, rough-milling a surface of mold-core using the micro-milling cutter according to a preset first machining track, to form a micro-projection array structure with a specific shape.

In step S200, milling by the micro-milling cutter according to the preset first machining track, thereby obtaining a desired micro-protrusion array structure.

S300. finishing a surface of the micro-protrusion array structure formed by rough-milling using the fine milling-grinding tool according to a preset second machining track, to form a desired micro-protrusion array structure, and the size of the micro-protrusion array structure formed by rough-milling is larger than the size of which formed by finishing.

In step S300, milling by the fine milling-grinding tool according to the preset second machining track, thereby processing and obtaining the desired high-precision micro-protrusion array structure, where the second machining track is the same as the first machining track.

S400, installing the mold-core on an injection molding machine, and adding particle material of polymer for micro injection molding to form a microfluidic chip, and a surface of the microfluidic chip has a micro-grooved array structure.

In step S400, a high-quality microfluidic chip with a micro-grooved array structure can be processed through injection molding, where the injection molding machine is a micro injection molding machine, and the polymer is granular.

Figure 2:
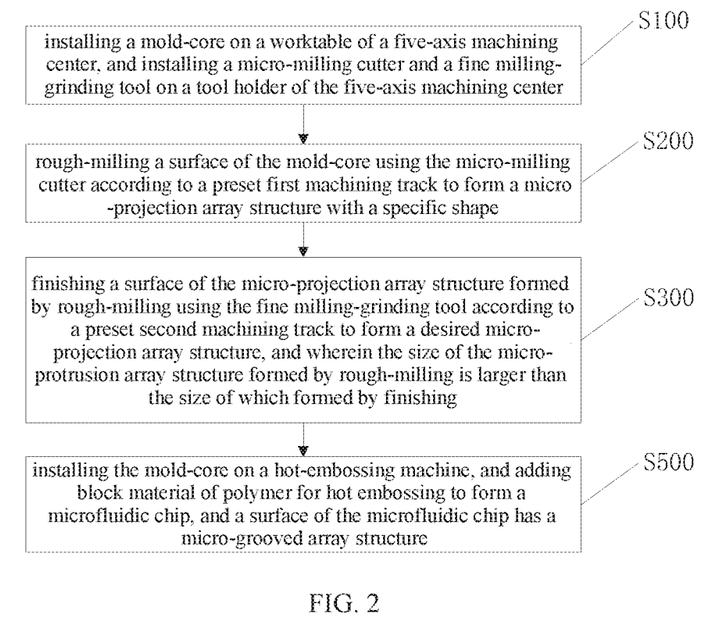
FIG. 2 is a flowchart of another manufacturing method of the microfluidic chip according to an embodiment of the present application.

Please refer to FIG. 2. the present application also provides another manufacturing method of a microfluidic chip, which includes steps S100, S200, S300 and S500:

S100. installing a mold-core on a worktable of a five-axis machining center, and installing a micro-milling cutter and a fine milling-grinding tool on a tool holder of the five-axis machining center.

S200. rough-milling a surface of mold-core using the micro-milling cutter according to a preset first machining track, to form a micro-projection array structure with a specific shape.

S300. finishing a surface of the micro-protrusion array structure formed by rough-milling using the fine milling-grinding tool according to a preset second machining track, to form a desired micro-protrusion array structure, and the size of the micro-protrusion array structure formed by rough-milling is larger than the size of which formed by finishing.

S500. installing the mold-core on a hot-embossing machine, and adding block material of polymer for hot embossing to form a microfluidic chip, and a surface of the microfluidic chip has a micro-grooved array structure.

In step S500, a high-quality microfluidic chip with a micro-grooved array structure can be processed by hot embossing, preferably, the hot-embossing machine is a plastic hot-embossing machine and the polymer is block.

The manufacturing methods of the microfluidic chip are provided hereby. Compared with the prior art, the manufacturing method of the microfluidic chip here includes steps of: rough-milling the surface of the mold-core 30 using the micro-milling cutter to form the micro-projection array structure 311 with a specific shape, then finishing the surface of the micro-protrusion array structure formed by rough-milling using the fine milling-grinding tool 20 to form a high-precision micro-protrusion array structure 311, and finally installing the mold-core 30 on the injection molding machine, and adding particle material of polymer for micro injection molding to efficiently form a microfluidic chip 40 with a high-quality micro-grooved array structure 41, or installing the processed mold-core 30 on the hot-embossing machine, and adding block material of polymer for hot embossing to form a high-quality micro-structured microfluidic chip 40. Where the shape of the microfluidic chip is controllable, which effectively improves the utilization rate of the surface of the microfluidic chip 40 and solves the problem that the shape and size accuracy and the processing quality of micro-structure process cannot be guaranteed as in prior arts the micro-structures of microfluidic chips are produced by the electrochemical etching processes such as laser beam processing, moreover the mass production and manufacture of microfluidic chips can be realized, and the manufacturing costs are greatly reduced.

Further, as a specific implementation of the manufacturing method of the microfluidic chip provided in the present application, a spindle speed of the five-axis machining center is between 5000 to 20,000 rpm, a feed depth of the micro-milling cutter is between 0.1 to 50 microns, a feed speed of the micro-milling cutter is between 10 to 1000 mm/min, a feed depth of the fine milling-grinding tool 20 is between 0.1 to 50 micrometers, and a feed speed of the fine milling-grinding tool 20 is between 100 to 1000 mm/min.

Further, as a specific implementation of the manufacturing method of the microfluidic chip provided in the present application, the size of the micro-protrusion array structure formed by rough-milling is 1.05 to 1.2 times of the size of the micro-protrusion array structure 32 formed by finishing, for example, it may be 1.05 times, 1.10 times or 1.2 times. By setting the size of the micro-projection array structure formed by rough-milling to be 1.05 to 1.2 times of the size of the micro-projection array structure 32 formed by finishing, the micro-projection array structure 32 after processing not only can provide a better accuracy, but also the processing efficiency can be improved.

Further, as a specific implementation of the manufacturing method of the microfluidic chip provided in the present application, before step S100, step S110 is further included: selecting a mold-core with a desired size according to the size of the micro-grooved array structure 41 of the microfluidic chip 40.

In step S110, the shape and size of the micro-grooved array structure 41 of the microfluidic chip 40 are generally designed according to reagent inspection schemes, and the micro-grooved array structure 41 of the microfluidic chip 40 has different shapes and sizes with respect to different reagent inspection schemes.

Further, as a specific implementation of the manufacturing method of the microfluidic chip provided in the present application, before step S100, the method further includes the step of: designing, in simulating processing software, the first machining track and the second machining track of the micro-milling cutter and the fine milling-grinding tool, respectively, and generating a G code for importing into the five-axis machining center.

Figure 7:
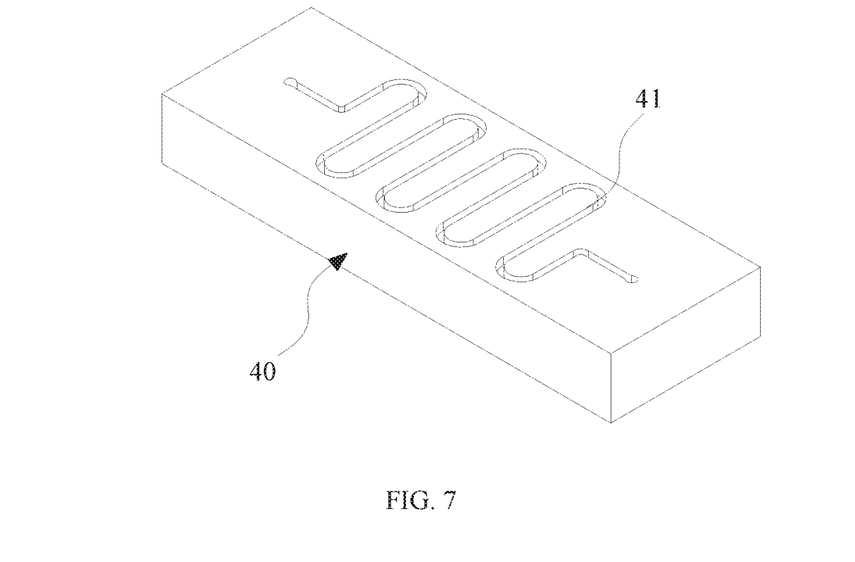
FIG. 7 is a schematic perspective view showing a structure of the microfluidic chip according to an embodiment of the present application.
Figure 8:
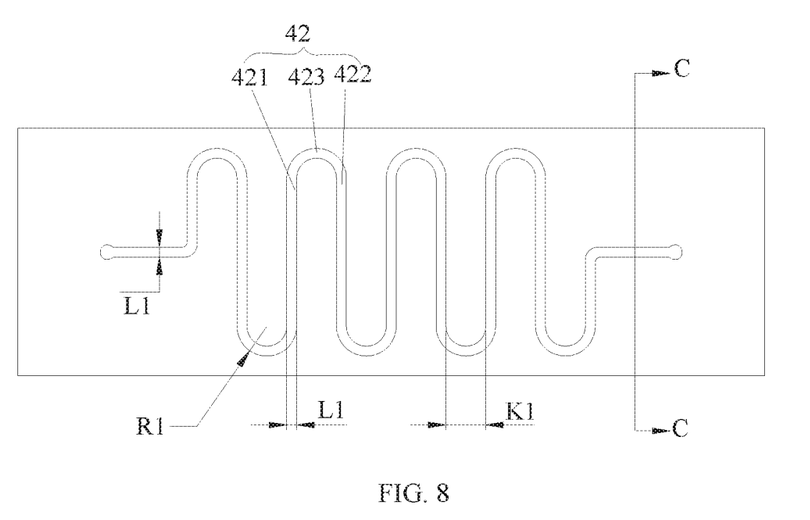
FIG. 8 is a top view of FIG. 7.
Figure 9:
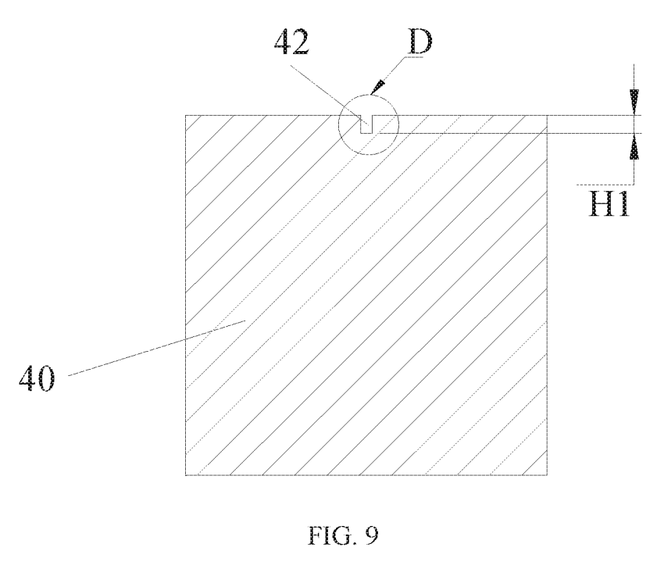
FIG. 9 is a sectional structural view taken along the line C-C in FIG. 8.

Further, shown in FIG. 7 to FIG. 9, as a specific implementation of the manufacturing method of the microfluidic chip provided in the present application, the micro-grooved array structure 41 includes a plurality of micro-channels 42 connected in sequence, the groove depth H1 of each micro-channel 42 is between 10 to 800 micrometers, for example, H1 may be 10 micrometers, 200 micrometers or 800 micrometers. the groove width L1 of the micro-channel 42 is between 10 to 500 microns, for example, L1 may be 10 microns, 200 microns or 500 microns.

Further, shown in FIG. 8, as a specific implementation of the manufacturing method of the microfluidic chip provided in the present application, each micro-channel 42 includes a first channel 421, a second channel 422 and a transition channel 423 connected between the first channel 421 and the second channel 422, and a trench interval K1 between the first channel 421 and the second channel 422 is in a range from 10 to 500 microns.

Figure 4:
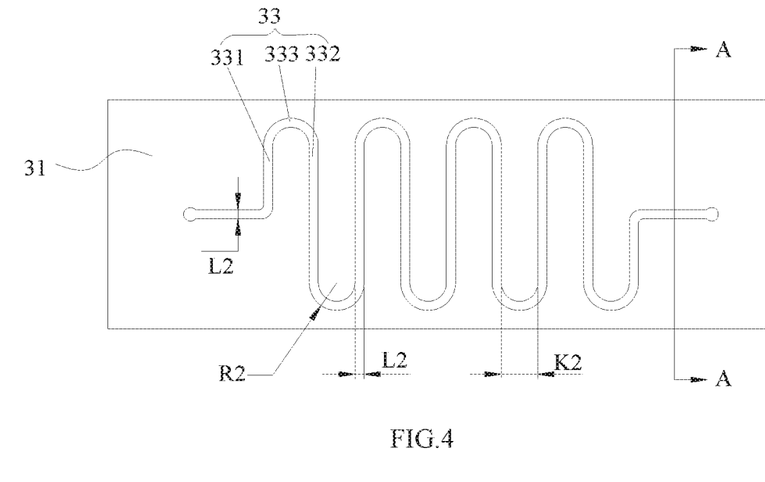
FIG. 4 is a top view of the micro-structured mold-core according to an embodiment of the present application.

Further, referring to FIG. 4, as a specific implementation of the micro-structured mold-core of the microfluidic chip provided in the present application, the first channel 421 and the second channel 422 may both be straight channels and transition channels 423 may be an arc-shaped channel, that is, the first channel 421 and the second channel 422 are connected through an arc-shaped transition section being naturally smooth. Specifically, the transition channel 423 may be arc-shaped. The radius R1 of the transition channel 423 is between 10 to 500 micrometers, for example, it may be 10 micrometers, 100 micrometers, 200 micrometers, 500 micrometers or the like.

Figure 13:
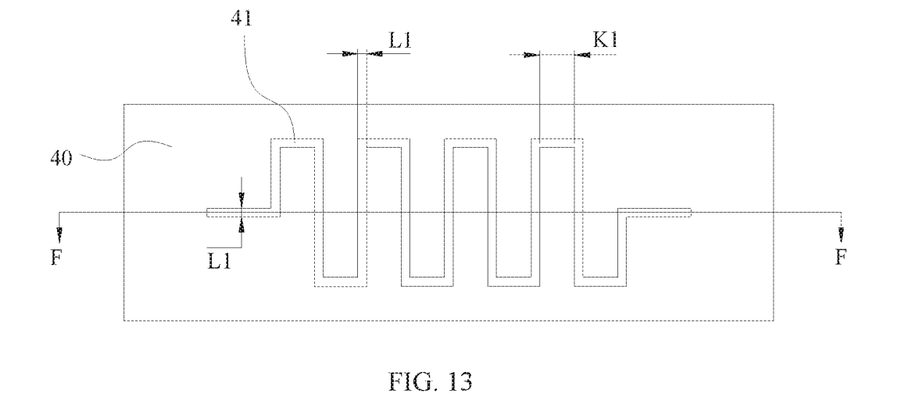
FIG. 13 is a top view of another microfluidic chip according to an embodiment of the present application.
Figure 14:
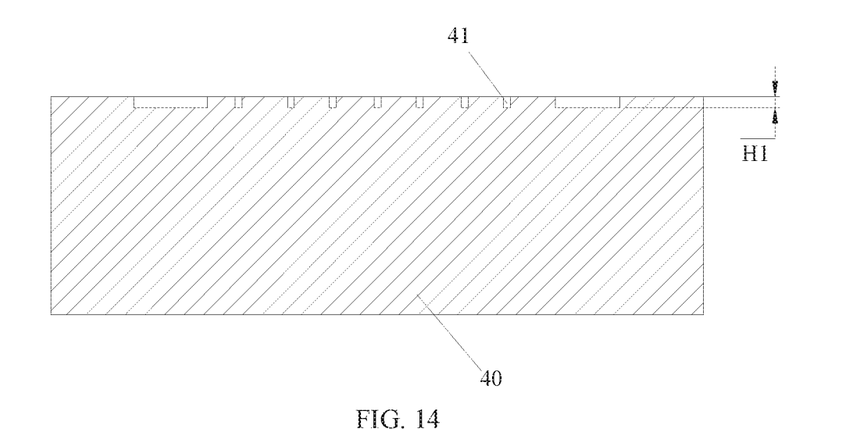
FIG. 14 is a sectional structural view taken along the line F-F in FIG. 13.

Further, please refer to both FIG. 13 and FIG. 14. as a specific implementation of the micro-structured mold-core of the microfluidic chip provided in the present application, the transition channel 423 may also be a straight channel, that is, the first channel 421 and the second channel 422 are connected through a right-angle transition.

Further, as a specific implementation of the manufacturing method of the microfluidic chip provided in the present application, in step S100, the material of the mold-core 30 is ceramic, diamond, mold steel or hard alloy.

Further, as a specific implementation of the manufacturing method of the microfluidic chip provided in the present application, the material of the microfluidic chip includes one of polyamide, polyethylene terephthalate, polydimethylsiloxane, polymethyl methacrylate, polypropylene or polycarbonate, or a mixture of two or more.

Figure 10:
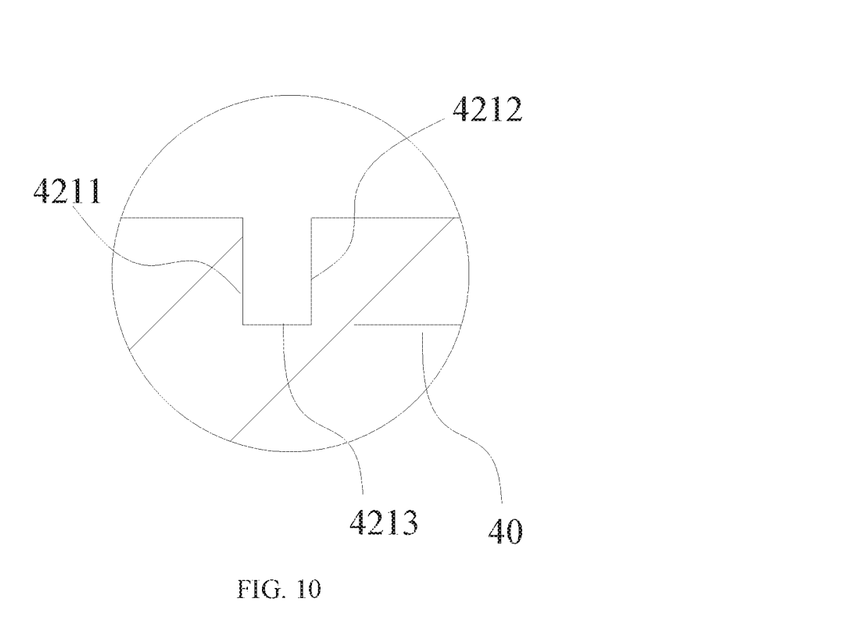
FIG. 10 is a partially enlarged view of the encircled portion D in FIG. 9.

Further, shown in FIG. 9 and FIG. 10, as a specific implementation of the manufacturing method of the microfluidic chip provided in the present application, in this implementation, the first channel 421, the second channel 422 and the transition channel 423 each includes a first side surface 4211, a second side surface 4212 disposed opposite to the first side surface 4211, and a bottom surface 4213, both ends of the bottom surface 4213 are connected to the first side surface 4211 and the second side surface 4212, respectively. The first side surface 4211, the bottom surface 4213 and the second side surface 4212 together form a rectangular shape, alternatively, in other implementations, they may also be V-shaped or U-shaped.

Figure 3:
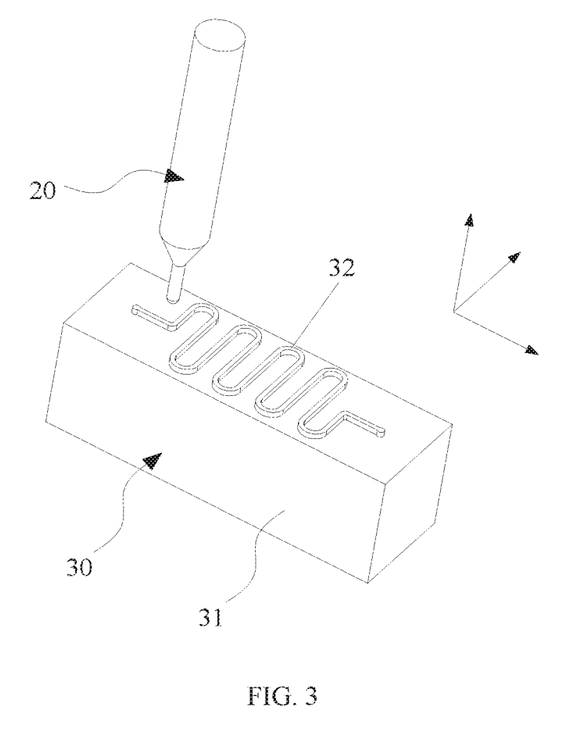
FIG. 3 is a schematic processing diagram of the micro-structured mold-core used in the microfluidic chip according to an embodiment of the present application.
Figure 5:
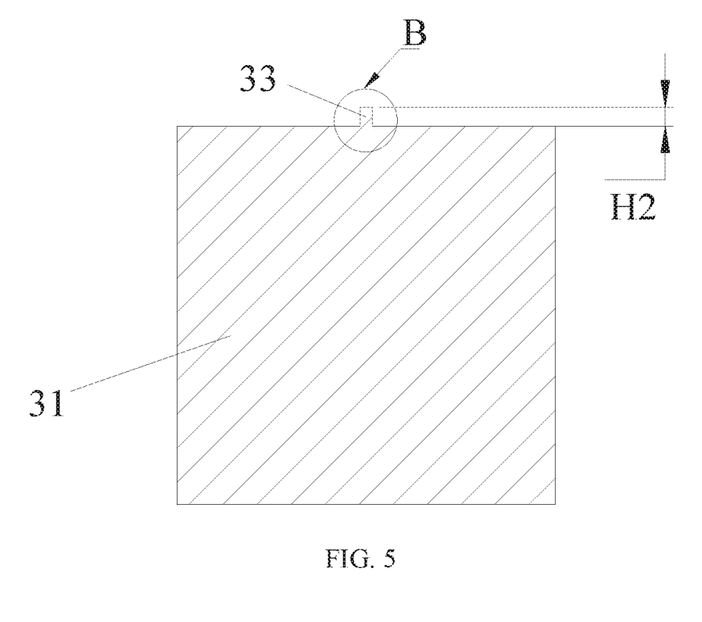
FIG. 5 is a sectional structural view taken along the line A-A in FIG. 4.

Please refer to FIG. 3 to FIG. 5, the present application also provides a micro-structured mold-core of a microfluidic chip, which includes a mold-core body 31. The surface of the mold-core body 31 is provided with a micro-projection array structure 32. The processing of the micro-projection array structure 32 includes: rough-milling the surface of the mold-core body 31 with a micro-milling cutter to form a micro-projection array structure with a specific shape, and finishing the surface of the micro-projection array structure formed by rough-milling using the fine milling-grinding tool 20. The micro-protrusion array structure 32 includes a plurality of micro-protrusions 33 connected in sequence. Each micro-protrusion 33 includes a first connection section 331, a second connection section 332 and a transition section 333 connected between the first connection section 331 and the second connection sections 332.

The micro-structured mold-core of the microfluidic chip is provided hereby. Compared with the prior art, the micro-structured mold-core of the microfluidic chip is formed by rough-milling the surface of the mold-core body 31 with a micro-milling cutter to form the micro-projection array structure with a specific shape, then finishing the surface of the rough-milled micro-protrusion array structure using the fine milling-grinding tool 20, so as to form a high-precision micro-protrusion array structure 31 on the surface of the mold-core body 31. Finally, installing the processed mold-core body 31 on an injection molding machine, and adding particle material of polymer for micro injection molding to efficiently form a microfluidic chip 40 with a high-quality micro-grooved array structure 41, or installing the processed mold-core 30 on the hot-embossing machine, and adding block material of polymer for hot embossing to form a high-quality micro-structured microfluidic chip 40, of which the shape is controllable, and it thus effectively improves the utilization rate of the surface of the microfluidic chip 40 and solves the problem that the shape and size accuracy and the processing quality of micro-structure process cannot be guaranteed as in prior arts the micro-structures of microfluidic chips are produced by the electrochemical etching processes such as laser beam processing, moreover the mass production and manufacture of microfluidic chips can be realized, and the manufacturing costs are greatly reduced.

Further, referring to FIG. 4, as a specific implementation of the micro-structured mold-core of the microfluidic chip provided in the present application, the first connection section 331 may be a straight section, the second connection section 332 may be a straight section, and the transition section 333 may be an arc-shaped section, that is, the first connection section 331 and the second connection section 332 are connected through an arc-shaped transition being naturally smooth. Specifically, the transition section 333 is circular arc-shaped. The radius R2 of the transition section 333 is in a range from 10 to 500 microns, and for example, it may be 10 microns, 100 microns, 200 microns, 500 microns and the like.

Figure 11:
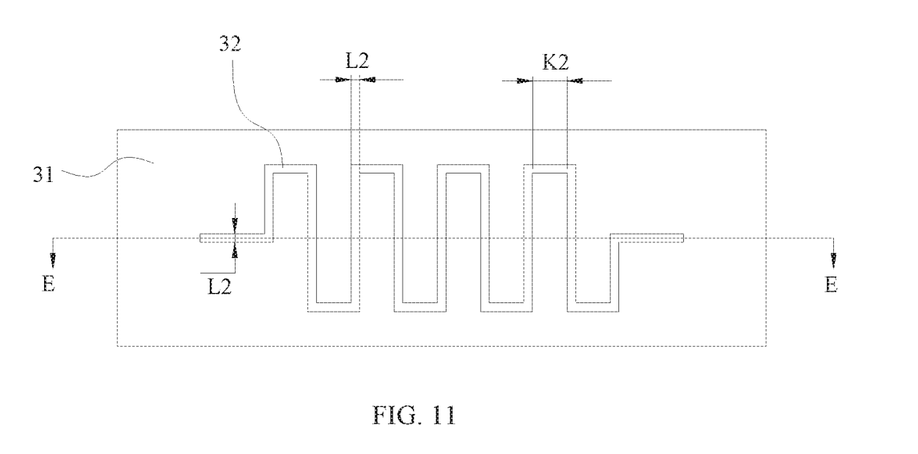
FIG. 11 is a top view of another micro-structured mold-core according to an embodiment of the present application.
Figure 12:
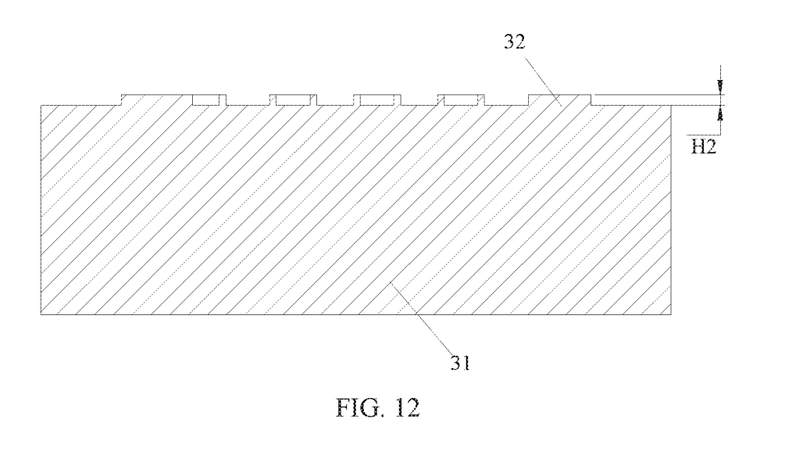
FIG. 12 is a sectional structural view taken along the line E-E in FIG. 11.

Further, please refer to FIG. 11 and FIG. 12. as a specific implementation of the micro-structured mold-core of the microfluidic chip provided in the present application, the transition section 333 may also be a straight section, that is, the first connection section 331 and the second connection section 332 is connected through a right-angle transition.

Further, please refer to FIG. 4 and FIG. 5, as a specific implementation of the micro-structured mold-core of the microfluidic chip provided in the present application, the heights H2 of the first connection section 331, the second connection section 332 and the transition section 333 are all between 10 to 800 microns, for example, H2 may be 10 microns, 200 microns, 500 microns or 800 microns. The widths L2 of the first connection section 331, the second connection section 332 and the transition section 333 are all between 10 to 500 microns, for example, L2 may be 10 microns, 100 microns, 300 microns or 500 microns. The interval distance K2 between the first connection section 331 and the second connection section 332 is in a range from 10 to 500 micrometers, for example, K2 may be 10 micrometers, 100 micrometers, 300 micrometers or 500 micrometers.

Figure 6:
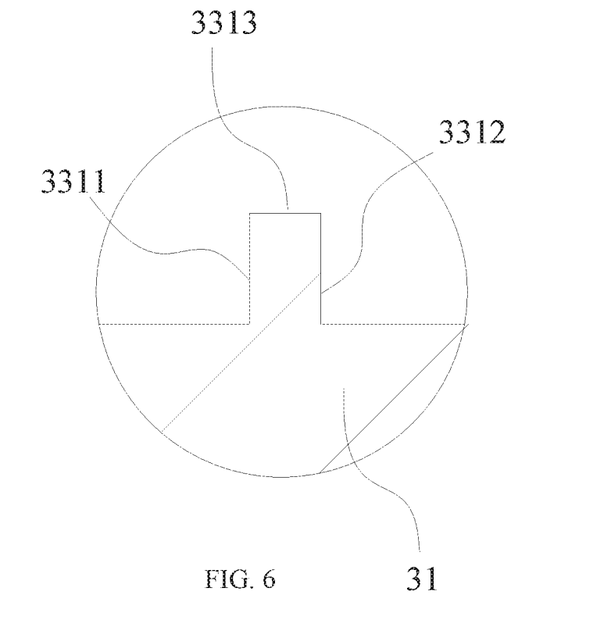
FIG. 6 is a partially enlarged view of the encircled portion B in FIG. 5.

Further, referring to FIG. 6, as a specific implementation of the micro-structured mold-core of the microfluidic chip provided in the present application, the first connection section 331, the second connection section 332 and the transition section 333 each includes a third side 3311, a fourth side surface 3312 disposed opposite to the third side surface 3311, and a top surface 3313. Both ends of the top surface 3313 are respectively connected to the third side surface 3311 and the fourth side surface 3312. The third side surface 3311, the top surface 3313, and the fourth side surface 3312 together form a rectangular shape. alternatively, in other implementations, it may also be V-shaped or U-shaped. The micro-protrusion array structures 32 is designed and processed to have different shapes and sizes with respect to the actually desired shape of micro groove array structure 41 of the microfluidic chip 40.

Further, as a specific implementation of the micro-structured mold-core of the microfluidic chip provided in the present application, the mold-core body 31 is a mold steel part or a hard alloy part, and its structural strength is relatively large.

Further, as a specific implementation of the micro-structured mold-core of the microfluidic chip provided in the present application, the micro-milling cutter is a tungsten steel milling cutter, which can effectively improve the service life of the micro-milling cutter.

Further, as a specific implementation of the micro-structured mold-core of the microfluidic chip provided in the present application, the fine milling-grinding tool 20 is a diamond fine milling-grinding tool. The fine milling-grinding tool made of diamond sintering has a high structural strength, which thus prevents the fine milling-grinding tool from being easily worn away, thereby increasing the service life of the fine milling-grinding tool.

The embodiments disclosed herein are merely some best modes of the present application, and are in no way limiting the present application. It should be understood for persons skilled in the art that modifications, equivalent replacements and improvements of some of the technical features can be implemented under the spirit of the present application, and should be included by the protection scope of the present application.

What is claimed is:

1. A manufacturing method of a microfluidic chip, comprising the following steps:
    installing a mold-core on a worktable of a five-axis machining center, and installing a micro-milling cutter and a fine milling-grinding tool on a tool holder of the five-axis machining center;
    rough-milling a surface of the mold-core using the micro-milling cutter according to a preset first machining track, to form a micro convex array structure with a specific shape;
    finishing a surface of the micro convex array structure formed by rough-milling using the fine milling-grinding tool according to a preset second machining track, to form a desired micro convex array structure, and wherein the size of the micro convex array structure formed by rough-milling is larger than the size of which formed by finishing; and
    installing the mold-core on an injection molding machine, and adding particle material of polymer for micro injection molding to form a microfluidic chip, and a surface of the microfluidic chip has a micro-grooved array structure.

2. The manufacturing method of a microfluidic chip according to claim 1, wherein a spindle speed of the five-axis machining center is in a range from 5000 to 20,000 rpm, and a feed depth of the micro-milling cutter is in a range from 0.1 to 50 micrometers, and a feed speed of the micro-milling cutter is in a range from 10 to 1000 mm/min.

3. The manufacturing method of a microfluidic chip according to claim 1, wherein the micro-grooved array structure comprises a plurality of micro-channels connected in sequence, and a groove depth of each micro-channel is in a range from 10 to 800 microns.

4. The manufacturing method of a microfluidic chip according to claim 3, wherein each of the micro-channels comprises a first channel, a second channel and a transition channel connected between the first channel and the second channel, and a trench interval between the first channel and the second channel ranges from 10 to 500 microns.

5. The manufacturing method of a microfluidic chip according to claim 1, wherein the material of the mold-core comprises ceramic, diamond, die steel or hard alloy.

6. The manufacturing method of a microfluidic chip according to claim 1, wherein the material of the microfluidic chip comprises one of polyamide, polyethylene terephthalate, polydimethylsiloxane, polymethyl methacrylate, polypropylene or polycarbonate, or a mixture of two or more.

7. The manufacturing method of a microfluidic chip according to claim 4, wherein the first channel, the second channel and the transition channel each comprises:
    a first side surface;
    a second side surface disposed opposite to the first side surface; and
    a bottom surface, both ends of which are respectively connected to the first side surface and the second side surface;
    the first side surface, the bottom surface and the second side surface together form a V-shape, a U-shape or a rectangle.

8. A manufacturing method of a microfluidic chip, comprising the following steps:
    installing a mold-core on a worktable of a five-axis machining center, and installing a micro-milling cutter and a fine milling-grinding tool on a tool holder of the five-axis machining center;
    rough-milling a surface of the mold-core using the micro-milling cutter according to a preset first machining track to form a micro convex array structure with a specific shape;
    finishing a surface of the micro convex array structure formed by rough-milling using the fine milling-grinding tool according to a preset second machining track to form a desired micro convex array structure, and wherein the size of the micro convex array structure formed by rough-milling is larger than the size of which formed by finishing; and installing the mold-core on a hot-embossing machine, and adding block material of polymer for hot embossing to form a microfluidic chip, and a surface of the microfluidic chip has a micro-grooved array structure.

9. The manufacturing method of a microfluidic chip according to claim 8, wherein a spindle speed of the five-axis machining center is in a range from 5000 to 20,000 rpm, and a feed depth of the micro-milling cutter is in a range from 0.1 to 50 micrometers, and a feed speed of the micro-milling cutter is in a range from 10 to 1000 mm/min.

10. The manufacturing method of a microfluidic chip according to claim 8, wherein the micro-grooved array structure comprises a plurality of micro-channels connected in sequence, and a groove depth of each micro-channel is in a range from 10 to 800 microns.

11. The manufacturing method of a microfluidic chip according to claim 10, wherein each of the micro-channels comprises a first channel, a second channel and a transition channel connected between the first channel and the second channel, and a trench interval between the first channel and the second channel ranges from 10 to 500 microns.

12. The manufacturing method of a microfluidic chip according to claim 8, wherein the material of the mold-core comprises ceramic, diamond, die steel or hard alloy.

13. The manufacturing method of a microfluidic chip according to claim 8, wherein the material of the microfluidic chip comprises one of polyamide, polyethylene terephthalate, polydimethylsiloxane, polymethyl methacrylate, polypropylene or polycarbonate, or a mixture of two or more.

14. The manufacturing method of a microfluidic chip according to claim 11, wherein the first channel, the second channel and the transition channel each comprises:
a first side surface;
a second side surface disposed opposite to the first side surface; and
a bottom surface, both ends of which are respectively connected to the first side surface and the second side surface;
the first side surface, the bottom surface and the second side surface together form a V-shape, a U-shape or a rectangle.

15. A micro-structured mold-core of a microfluidic chip with a mold-core body, wherein,
a micro convex array structure being disposed on a surface of the mold-core body, wherein the micro convex array structure is formed by rough-milling the surface of the mold-core body with a micro-milling cutter to form a micro convex array structure with a specific shape, and finishing the surface of the micro convex array structure formed by rough-milling using a fine milling-grinding tool, wherein the micro convex array structure comprises a plurality of micro convexities connected in sequence, and each of the micro convexities comprises a first connection section, a second connection section and a transition section connected between the first connection section and the second connection section.

16. The micro-structured mold-core of a microfluidic chip according to claim 15, wherein the first connection section is a straight section, the second connection section is a straight section, and the transition section is an arc-shaped or a straight section.

17. The micro-structured mold-core of a microfluidic chip according to claim 15, wherein the heights of the first connection section, the second connection section and the transition section each of which is in a range from 10 to 800 microns, and the widths of the first connection section, the second connection section and the transition section each of which is in a range from 10 to 500 microns, and an interval distance between the first connection section and the second connection section is in a range from 10 to 500 microns.

18. The micro-structured mold-core of a microfluidic chip according to claim 15, wherein the first connection section, the second connection section and the transition section each comprises:
a third side surface,
a fourth side surface opposite to the third side surface; and
a top surface, two ends of which are respectively connected to the third side surface and the fourth side surface;
the third side surface, the top surface and the fourth side surface together form a V shape, a U shaped or a rectangle.

* * * * *